United States Patent
Nakanishi

(10) Patent No.: US 10,656,831 B2
(45) Date of Patent: May 19, 2020

(54) DISPLAY INPUT DEVICE AND METHOD FOR CONTROLLING DISPLAY INPUT DEVICE

(71) Applicant: KYOCERA Document Solutions Inc., Osaka (JP)

(72) Inventor: Shinichi Nakanishi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/267,093

(22) Filed: Feb. 4, 2019

(65) Prior Publication Data
US 2019/0272092 A1    Sep. 5, 2019

(30) Foreign Application Priority Data
Mar. 5, 2018   (JP) .................... 2018-039099

(51) Int. Cl.
*G06F 3/0488*    (2013.01)
*G06F 3/041*    (2006.01)

(52) U.S. Cl.
CPC ........ *G06F 3/04886* (2013.01); *G06F 3/0412* (2013.01)

(58) Field of Classification Search
CPC . G06F 3/04886; G06F 3/04883; G06F 3/0412
See application file for complete search history.

(56) References Cited

U.S. PATENT DOCUMENTS

2011/0239153 A1* 9/2011 Carter ................. G06F 3/04812
715/784

FOREIGN PATENT DOCUMENTS

JP    2011-164798 A    8/2011

* cited by examiner

*Primary Examiner* — Yaron Cohen
(74) *Attorney, Agent, or Firm* — Stein IP, LLC

(57) ABSTRACT

A display input device includes a display panel, a touch panel, and a controller. The controller displays a cursor which indicates an input position in an input result display field. When a specific key is touched first, and while the touch is kept, the touched position moves to a character key, and then the touch ceases, the controller makes the cursor move to the position of the character corresponding to a touch-end key, which is the character key on which the touch ceases.

6 Claims, 9 Drawing Sheets

DISPLAY INPUT DEVICE AND METHOD FOR CONTROLLING DISPLAY INPUT DEVICE

INCORPORATION BY REFERENCE

This application is based upon and claims the benefit of priority from the corresponding Japanese Patent Application No. 2018-039099, filed on Mar. 5, 2018, the contents of which are hereby incorporated by reference.

BACKGROUND

The present disclosure relates to a display input device including a display panel and a touch panel.

Some devices are provided with a display panel having a touch panel for setting and operating purposes. Operation on buttons displayed on the display panel is sensed by the touch panel. Settings are made by touching the screen. One known display control device includes a display panel having a touch panel like the one described below.

Specifically, described are a touch panel and a display control device that operates as follows. On the touch panel, a plurality of display items representing a plurality of pieces of electronic data belonging to a first group are displayed; whether, out of a plurality of display items that are displayed, any of the display item is touched is checked; out of the plurality of display items that are displayed, the display items other than the selected item that is a display item judged to be touched stops being displayed; on the touch panel, display items representing electronic data included in a second group that is different from the first group is displayed; after the second group is displayed, whether the touch on the selected item is released is checked; if the position at which the touch on the selected item is judged to be released is the position of the display item representing the move or the copy to the second group, the electronic data represented by the selected item is moved or copied from the first group to the second group.

Modern recent image forming apparatuses are fitted with an operation panel. The operation panel includes a display panel and a touch panel. Some image forming apparatuses make the display panel display a software keyboard for inputting characters. The software keyboard includes software keys for inputting characters. A user touches software keys to input characters. Using the software keyboard, the user inputs, for example, an address.

SUMMARY

A display input device according to one aspect of the present disclosure includes a display panel, a touch panel, and a controller. The display panel performs display. The touch panel senses touch operations on the display panel. The controller makes the display panel display a software keyboard screen including a plurality of software keys. Based on the output of the touch panel, the controller recognizes the operated software key. The controller displays an input result display field that displays characters input through the operation of the software keys on the software keyboard screen, and displays a cursor that indicates an input position in the input result display field. When a specific key, which is a prescribed software key, is touched first, and while the touch is kept, the touched position moves to a character key, and then the touch ceases, the controller makes the cursor move to the position of, out of characters in the input result display field, the character corresponding to a touch-end key, which is the character key on which the touch ceases. The character key is a software key for inputting characters.

This and other objects of the present disclosure, and the specific benefits obtained according to the present disclosure, will become apparent from the description of embodiments which follows.

DETAILED DESCRIPTION

The present disclosure allows, in input character strings (text), a cursor to move or jump to a desired position. Hereinafter, with reference to FIGS. 1 to 10, an embodiment of the present disclosure will be described. In the following description, an image forming apparatus including a display input device (an operation panel 5) will be described. A multifunction peripheral 100 will be taken as an example of the image forming apparatus. It should however be noted that all the features described in connection with the embodiment in terms of structures, arrangements, and the like are merely examples and are not meant to limit the scope of the disclosure.

<The Multifunction Peripheral 100>

Figure 1:
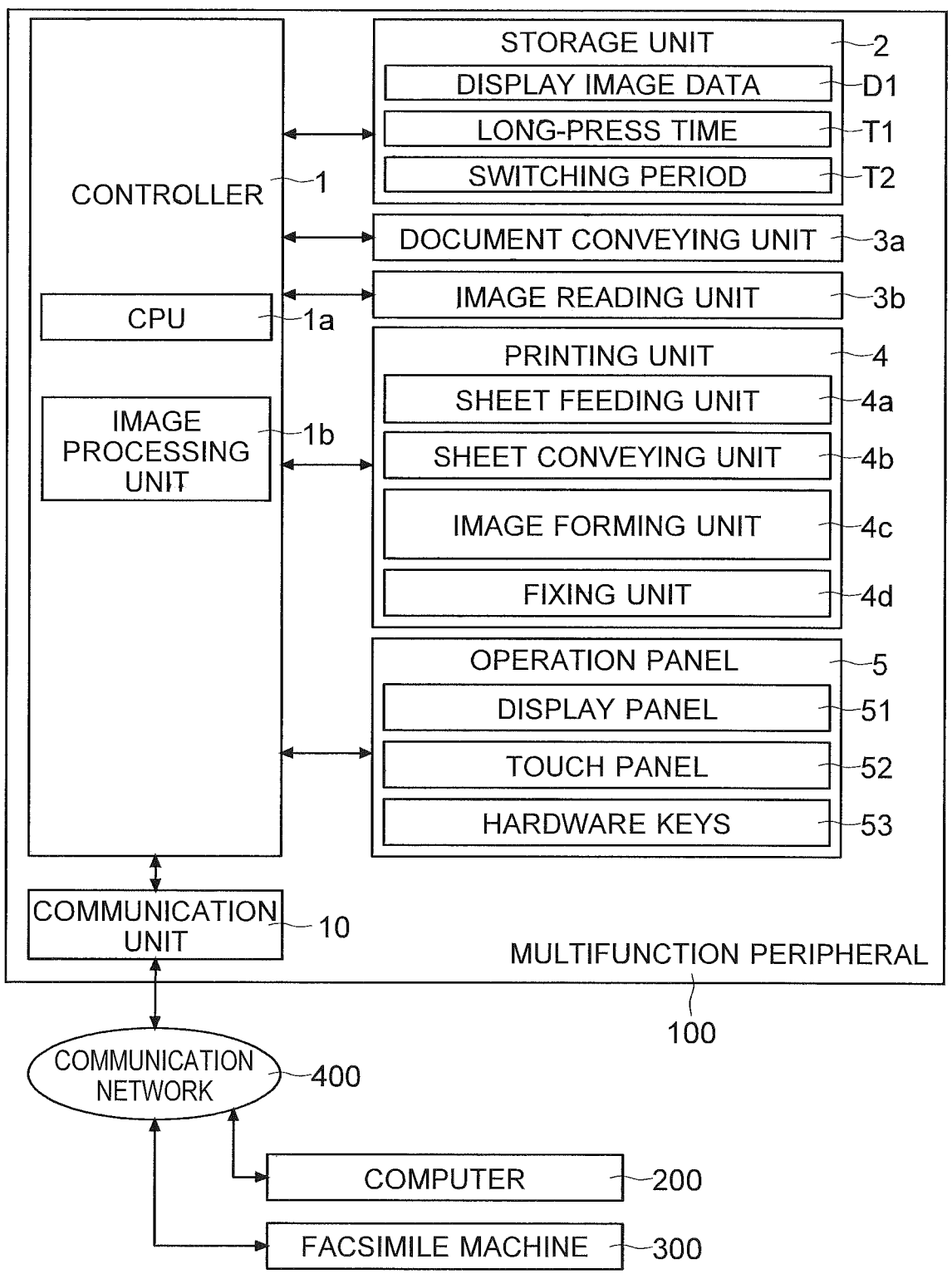
FIG. 1 is a diagram showing one example of a multifunction peripheral according to an embodiment.

First, with reference to FIG. 1, an overview of the multifunction peripheral 100 according to the embodiment will be described. The multifunction peripheral 100 includes a controller 1 and a storage unit 2. The controller 1 controls the operation of the multifunction peripheral 100. The controller 1 is a circuit board including a CPU 1*a* and an image processing unit 1*b*. The storage unit 2 includes storage devices such as a ROM, a RAM, and a HDD. The storage unit 2 stores data, settings, and programs for controlling the multifunction peripheral 100. The CPU 1*a* controls the multifunction peripheral 100 based on the programs and the data stored in the storage unit 2.

The multifunction peripheral 100 includes a document conveying unit 3*a* and an image reading unit 3*b*. When a job involving document reading is performed, the controller 1 makes the image reading unit 3*b* convey a document. In the document conveying unit 3*a*, a document comprising a plurality of sheets can be set. When a document is set in the document conveying unit 3a, the controller 1 makes the document conveying unit 3a convey the set document one sheet after another toward a reading position (a contact glass for conveyed-document reading, unillustrated). The document conveying unit 3a consecutively and automatically conveys the set document. The controller 1 makes the image reading unit 3b read the document conveyed by the document conveying unit 3a. When a document is set on a contact glass for placed-document reading (unillustrated), the controller 1 makes the image reading unit 3b read the document set on the contact glass for placed-document reading. The image reading unit 3b generates image data of the read document.

The printing unit 4 includes a sheet feeding unit 4a, a sheet conveying unit 4b, an image forming unit 4c, and a fixing unit 4d. When a job involving printing is performed, the controller 1 makes the sheet feeding unit 4a feed a sheet. The controller 1 makes the sheet conveying unit 4b convey the sheet along the conveying passages in the apparatus. The controller 1 makes the image forming unit 4c form a toner image based on image data of an image to be formed. The controller 1 makes the fixing unit 4d fix the transferred toner image to the sheet.

The communication unit 10 includes a communication circuit and a communication memory. The communication memory stores communication software and data to be communicated. The communication unit 10 can communicate with a computer 200, a facsimile machine 300, or the like via a communication network 400. The communication unit 10 receives printing data transmitted from the computer 200. Printing data includes image data and data written in a page description language. Based on the received printing data, the controller 1 makes the printing unit 4 perform printing (a print job); it can also send the image data from the communication unit 10 toward the external computer 200. The communication unit 10 can transmit the image data read by the image reading unit 3b to the facsimile machine 300 (a transmission job).

The multifunction peripheral 100 includes the operation panel 5. The operation panel 5 includes a display panel 51, a touch panel 52, and hardware keys 53. The controller 1 controls display on the display panel 51. The controller 1 displays operation images on a screen. The operation images include, for example, software keys, buttons, tabs, and check boxes. The storage unit 2 stores image data (display image data) of the screens and images to be displayed on the display panel 51. The controller 1 provides the display image data to the display panel 51. The controller 1 makes the display panel 51 display screens and images.

The touch panel 52 is fitted to the display panel 51. The touch panel 52 outputs signals corresponding to the position touched by a user. The output of the touch panel 52 is input to the controller 1. Based on the output of the touch panel 52, the controller 1 recognizes operation by a user, the touched position, and the operation image that is operated (touched).

The operation panel 5 includes the hardware keys 53. The hardware keys 53 include, for example, a Start key and a numeric keypad. The Start key is a key for instructing to start job execution. The numeric keypad has keys for inputting numbers. When any of the hardware keys 53 is pressed, a signal corresponding to the pressed hardware key 53 is output. Based on the output signal from the operation panel 5, the controller 1 recognizes the operated hardware key 53. The controller 1, based on the settings made by a user, makes the image reading unit 3b, the printing unit 4, and the communication unit 10 operate.

The multifunction peripheral 100 includes the operation panel 5 and the controller 1. The operation panel 5 includes the display panel 51 which performs display. The operation panel 5 includes the touch panel 52 that senses touch operations on the display panel 51. The controller 1 controls the multifunction peripheral 100 as well as functions as a unit for controlling the display input device. The multifunction peripheral 100 includes the display input device.

<A Software Keyboard Screen 5a>

Next, with reference to FIG. 2, one example of a software keyboard screen 5a according to the embodiment will be described. When characters or text needs to be input, the controller 1 makes the display panel 51 display the software keyboard screen 5a.

For example, when a destination of a transmission job is set, the controller 1 makes the display panel 51 display the software keyboard screen 5a. The destination includes, for example, an address, a path, and a facsimile number. When information related to a user is registered, the controller 1 makes the display panel 51 display the software keyboard screen 5a. For example, an administrator of the multifunction peripheral 100 can set on the software keyboard screen 5a, for an authorized user, his/her name, password, department, path to the computer 200, and e-mail address. When making the storage unit 2 store image data (an image file) in a non-volatile manner, the controller 1 makes the display panel 51 display the software keyboard screen 5a. A user can set the name of an image file using the software keyboard screen 5a. When an e-mail is sent from the multifunction peripheral 100, the controller 1 makes the display panel 51 display the software keyboard screen 5a. A user can edit e-mail text on the software keyboard screen 5a.

In this way, the operation panel 5 (display panel 51, touch panel 52) accepts input of character strings and text such as, for example, a destination, user information, an image file name, and e-mail text. The controller 1 recognizes the character strings input on the operation panel 5.

Figure 2:
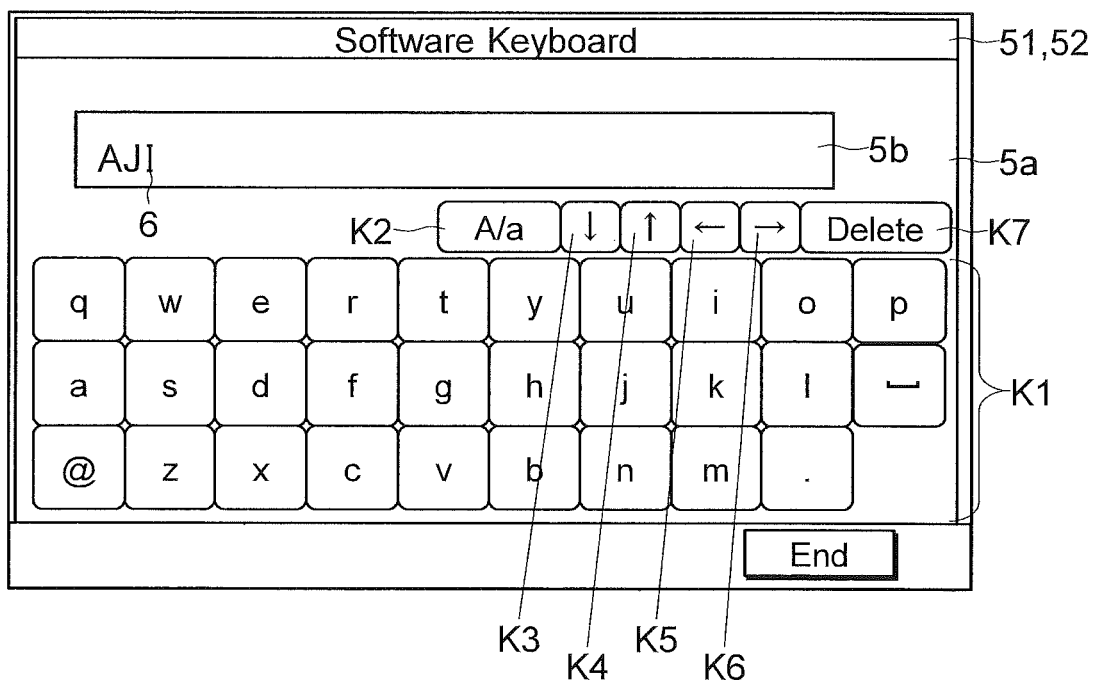
FIG. 2 is a diagram showing one example of a software keyboard screen according to the embodiment.

FIG. 2 shows one example of the software keyboard screen 5a. The controller 1 makes the display panel 51 display the software keyboard screen 5a. The software keyboard screen 5a includes a plurality of software keys. Based on the output of the touch panel 52, the controller 1 recognizes the software key that is operated. The controller 1 makes the software keyboard screen 5a display an input result display field 5b. The input result display field 5b is a field in which characters (character strings, text) input through the operation of the software keys are displayed.

The software keys include character keys K1. The character keys K1 are software keys for inputting characters. FIG. 2 shows character keys K1 for inputting alphabets. On the operation panel 5, a language to be used can be selected. The character keys K1 corresponding to the selected language are displayed. Symbol keys for inputting symbols are a kind of character keys K1. The software keyboard screen 5a in FIG. 2 includes the symbol keys for inputting "@" (at mark), "." (period), and a space.

The controller 1 makes the input result display field 5b display a cursor 6. The cursor 6 indicates an input position. The cursor 6 indicates a position at which a character corresponding to the operated character key K1 will be inserted. In this embodiment, the cursor 6 is in the shape of the capital I of the alphabet. The shape of the cursor 6 is not limited to this. The controller 1 may make the cursor 6 blink.

The software keys include keys for editing character strings and text. The software keyboard screen 5a in FIG. 2 includes a case-switching key K2, a down-arrow key K3, an up-arrow key K4, a left-arrow key K5, a right-arrow key K6, and a delete key K7. The case-switching key K2 is a key for switching the case of characters (alphabet letters) to be input. FIG. 2 shows a state where the lower case is selected. In a state where uppercase characters are input, the controller 1 displays alphabet letters in the character keys K1 in the upper case. By operating the case-switching key K2, it is possible to switch between uppercase and lowercase input.

The down-arrow key K3 is a software key for moving the cursor 6 down one position. The up-arrow key K4 is a software key for moving the cursor 6 up one position. The left-arrow key K5 is a software key for moving the cursor 6 one position to the left. The right-arrow key K6 is a software key for moving the cursor 6 one position to the right. The delete key K7 is a software key for deleting (erasing) characters. When the delete key K7 is operated, the controller 1 deletes the character on the left of the cursor 6. When the delete key K7 is operated, the controller 1 may delete the character on the right of the cursor 6.

<Moving the Cursor 6>

Every time the down-arrow key K3, the up-arrow key K4, the left-arrow key K5, or the right-arrow key K6 is operated (touched) once, the controller 1 makes the cursor 6 move one position. A user can move the cursor 6 by operating the arrow keys.

Here, a user may notice an input error. A user may notice, for example, a spelling error or a missing character. Conventionally, when the position of an input error is away from the current input position, it is necessary to operate the arrow keys many times to move the input position. This is a troublesome operation. To avoid this, in the display input device (multifunction peripheral 100), it is possible to make the cursor 6 jump with one (sequence of) operation. When the operation panel 5 (touch panel 52) accepts an operation for making the cursor 6 jump, the controller 1 makes the cursor 6 jump.

In the display input device (multifunction peripheral 100), the operation for making the cursor 6 jump involves touching a prescribed specific key first out of the software keys, and then while keeping the touch, moving the touched position to the character keys K1, and then ending the touch (removing the finger). When this operation is performed, the controller 1 makes the cursor 6 move to the position of a character, out of characters in the input result display field 5b, corresponding to the character key K1 on which the touch is ended (hereinafter referred to as a touch-end key K8). Now, jumping of the cursor 6 will be described.

<Moving the Cursor 6 Using the Delete Key K7>

Next, with reference to FIGS. 3 and 4, one example of moving the cursor 6 using the delete key K7 according to the embodiment will be described. The controller 1 makes the software keyboard screen 5a display the delete key K7. The delete key K7 is used as the specific key. First, a user operates the delete key K7. Next, the user slides the touched position to the character key K1 corresponding to the character to be deleted. Here, the user moves the touched position while keeping the touch. After touched position is moved, the user ends the touch. When the touch is ended, the controller 1 makes the cursor 6 jump. The controller 1 recognizes the touch-end key K8. The touch-end key K8 is a character key K1 on which the touch ceases (the finger is removed, the touch ends).

Figure 3:
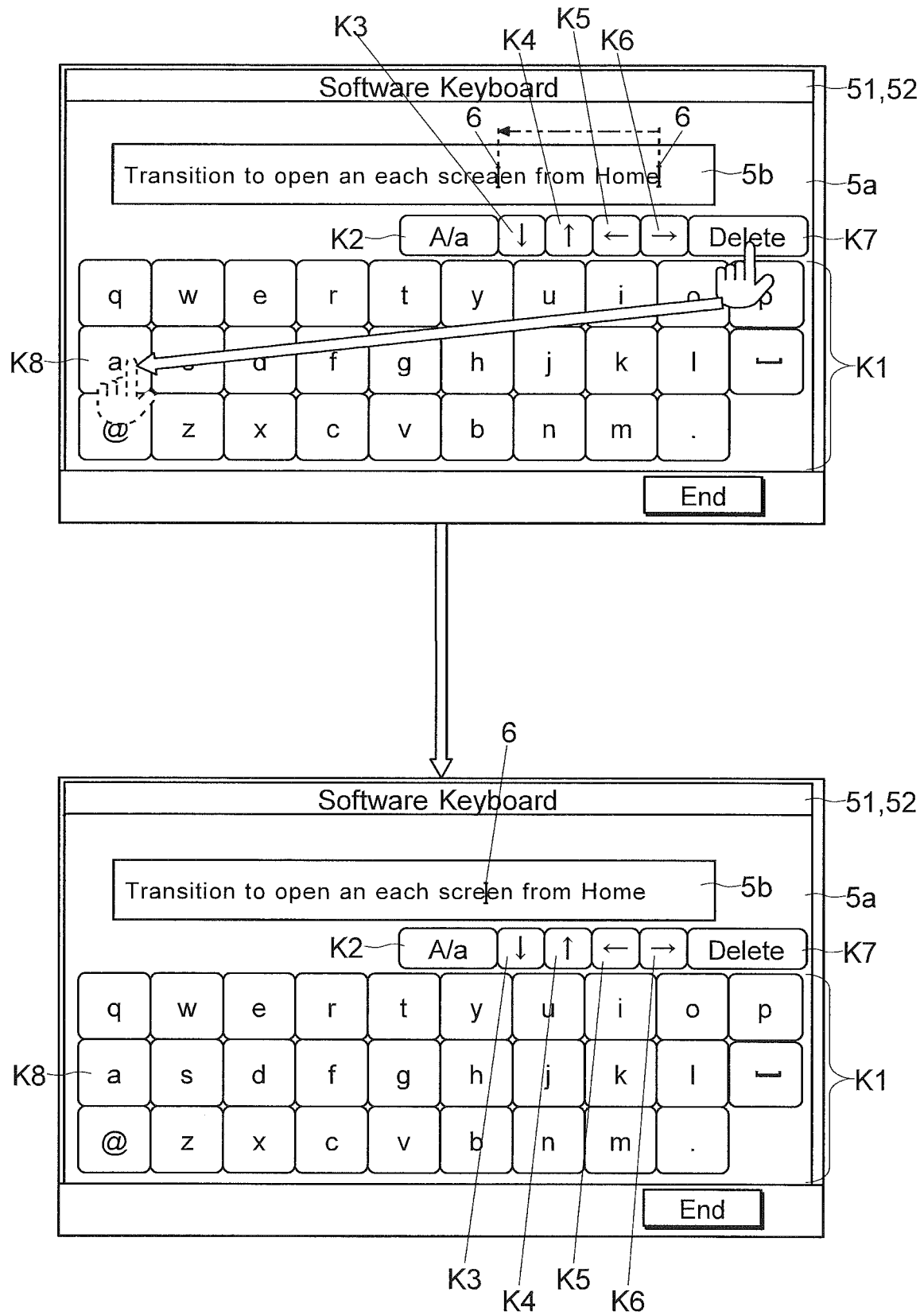
FIG. 3 is a diagram showing one example of moving a cursor using a delete key according to the embodiment.

The controller 1 makes the cursor 6 move in the direction toward the beginning of the character strings (leftward in FIG. 3). In other words, the controller 1 makes the cursor 6 jump in the direction opposite to the input order. When, before a touch on the same character key K1 exceeds a long-press time T1, the touch is ended, the controller 1 makes the cursor 6 move to, out of characters corresponding to the touch-end key K8, the character closest, in the direction toward the beginning of the character strings, to the position of the cursor 6 before the move. The long-press time T1 can be prescribed. The storage unit 2 stores the long-press time T1 (see FIG. 1). The long-press time T1 is set at, for example, one to several seconds. For example, the controller 1 makes the cursor 6 move to the right side of a character corresponding to the touch-end key K8 (it may be the left side).

The upper part of FIG. 3 shows how the delete key K7 is touched first, and then, while the touch is kept, the touched position is moved to the character key K1 for the alphabet letter "a". It also shows how the touch is ended on the character key K1 for the alphabet letter "a". Based on the output of the touch panel 52, the controller 1 recognizes the touch on the delete key K7, the sliding of the touched position, and the end of the touch. In the upper part of FIG. 3, the position of the cursor 6 before the move (when the delete key K7 was operated) is at the end of the character strings (text).

The upper part of FIG. 3 shows how the cursor 6 is moved with those operations. Specifically, the upper part of FIG. 3 shows how the cursor 6 is moved to the letter "a" corresponding to the touch-end key K8 (see the dash-dot-dot-line arrow). The cursor 6 jumps to the right side of the letter "a" closest to the position of the cursor 6 before the move.

As shown in the lower part of FIG. 3, the controller 1 automatically deletes the character which corresponds to the touch-end key K8 and which is next to (immediately on the left of) the cursor 6 after the move. The lower part of FIG. 3 shows a state after the alphabet letter "a" is deleted.

Figure 4:
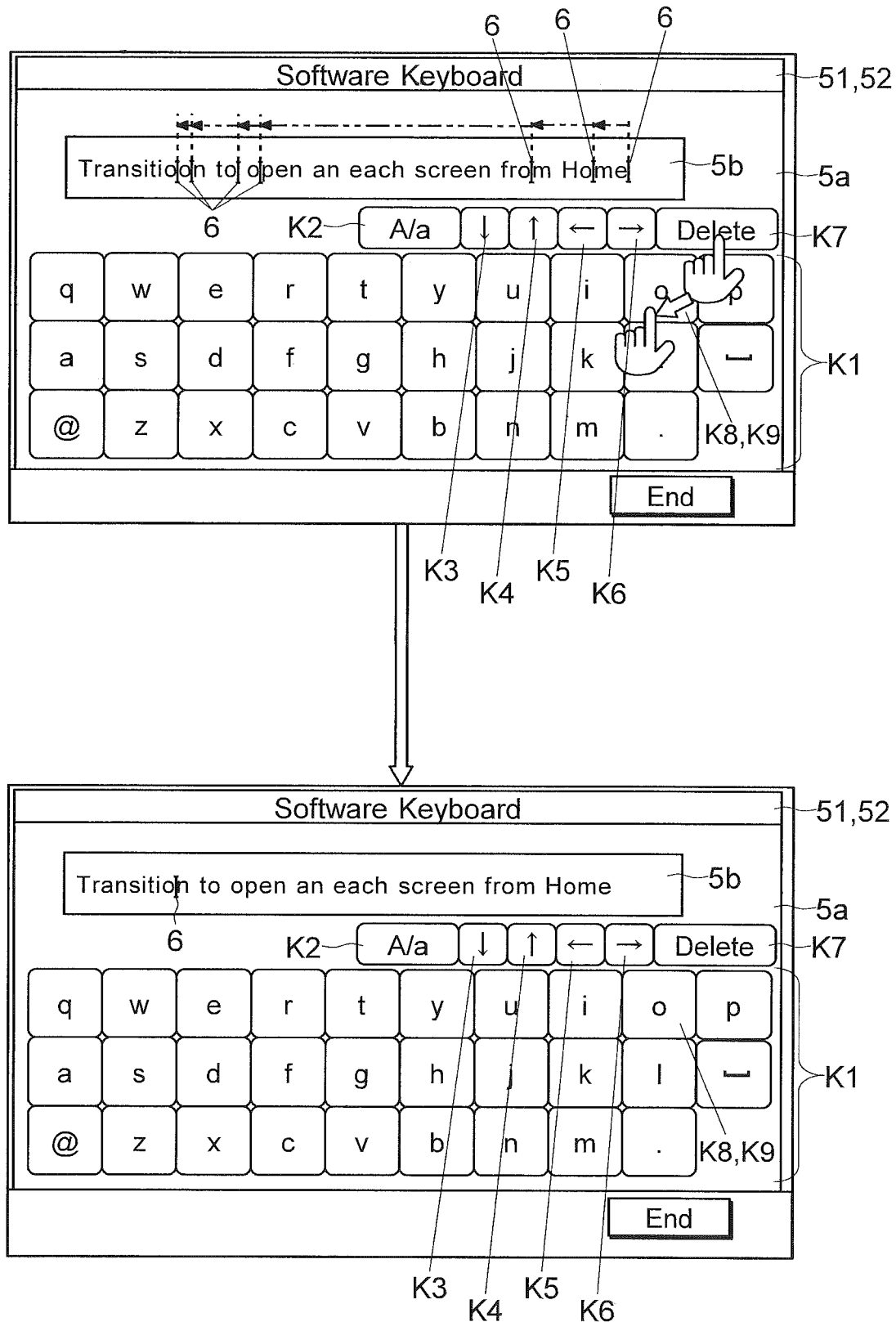
FIG. 4 is a diagram showing one example of moving the cursor using the delete key according to the embodiment.

By long-pressing a character key K1, the position of the cursor 6 can be moved from one place to the next (FIG. 4). To move the position of the cursor 6 from one place to the next, a user first operates the delete key K7. Next, the user slides the touched position to the character key K1 corresponding to the character to be deleted. The user moves the touched position while keeping the touch. After touched position is moved, the user long-presses the character key K1. The controller 1 recognizes the touch on the same character key K1 to have lasted for the long-press time T1. The controller 1 recognizes the long-pressed character key K1 (a long-press key K9).

When the touch on the same character key K1 lasts for the long-press time T1, the controller 1 makes the cursor 6 move in the direction toward the beginning of the character strings (leftward in FIG. 4). In other words, the controller 1 makes the cursor 6 jump in the direction opposite to the input order. The controller 1 makes the cursor 6 move to the position of, out of characters corresponding to the long-press key K9, the character closest to the position of the cursor 6 before the move. For example, the controller 1 makes the cursor 6 move to the right side of the character corresponding to the long-press key K9 (it may be the left side).

When the input result display field 5b includes a plurality of characters corresponding to the long-press key K9, after the touch that has lasted for the long-press time T1, every time the time for which the long-press key K9 is kept touched passes a prescribed switching period T2, the controller 1 makes the cursor 6 move (jump). The switching period T2 can be prescribed. The storage unit 2 stores the switching period T2 (see FIG. 1). The switching period T2 is set at, for example, one to several seconds. The switching period T2 may be equal to the long-press time T1.

Every time the switching period T2 passes, the controller 1 makes the cursor 6 move in the direction toward the beginning of the character strings (leftward in FIG. 4). The controller 1 makes the cursor 6 move to the position of, out of characters corresponding to the long-press key K9, the character which is on the side toward the beginning of the character stings and is closest to the current position of the cursor 6. For example, the controller 1 makes the cursor 6 move to the right side of the character corresponding to the long-press key K9 (it may be the left side).

The upper part of FIG. 4 shows how the delete key K7 is touched first, and then, while the touch is kept, the touched position is moved to the character key K1 for the alphabet letter "o". It also shows how the character key K1 for the alphabet letter "o" is kept touched longer than the long-press time T1. Based on the output of the touch panel 52, the controller 1 recognizes the touch on the delete key K7, the sliding of the touched position, and the long-press on a character key K1. In the upper part of FIG. 4, the position of the cursor 6 at first (when the delete key K7 was operated) is at the end of the character strings (text).

The upper part of FIG. 4 shows how the cursor 6 is moved from one place to the next by continuing the touch (long-pressing) on a character key K1. Specifically, the upper part of FIG. 4 shows how the cursor 6 is moved, from one place to the next, to the positions of the letter "o" corresponding to the long-press key K9 (see the dash-dot-dot-line arrow).

Furthermore, as shown in the lower part of FIG. 4, the controller 1 automatically deletes, out of characters corresponding to the long-press key K9, the character next to (immediately on the left of) the cursor 6 when the touch ceases. The lower part of FIG. 4 shows a state after the alphabet letter "o" is deleted. When the cursor 6 has moved to the character to be deleted, a user can end the touch.

<Moving the Cursor 6 Using the Left-Arrow Key K5>

Next, with reference to FIGS. 5 and 6, one example of moving the cursor 6 using the left-arrow key K5 according to the embodiment will be described. The controller 1 makes the software keyboard screen 5a display the left-arrow key K5. The left-arrow key K5 is used as the specific key. First, a user operates the left-arrow key K5. Next, the user slides the touched position to the character key K1 corresponding to the character at a position to which the user wants to move the cursor 6. Here, the user moves the touched position while keeping the touch. After moving the touched position, the user ends the touch. The controller 1 recognizes the touch-end key K8. Then, the controller 1 makes the cursor 6 jump.

Figure 5:
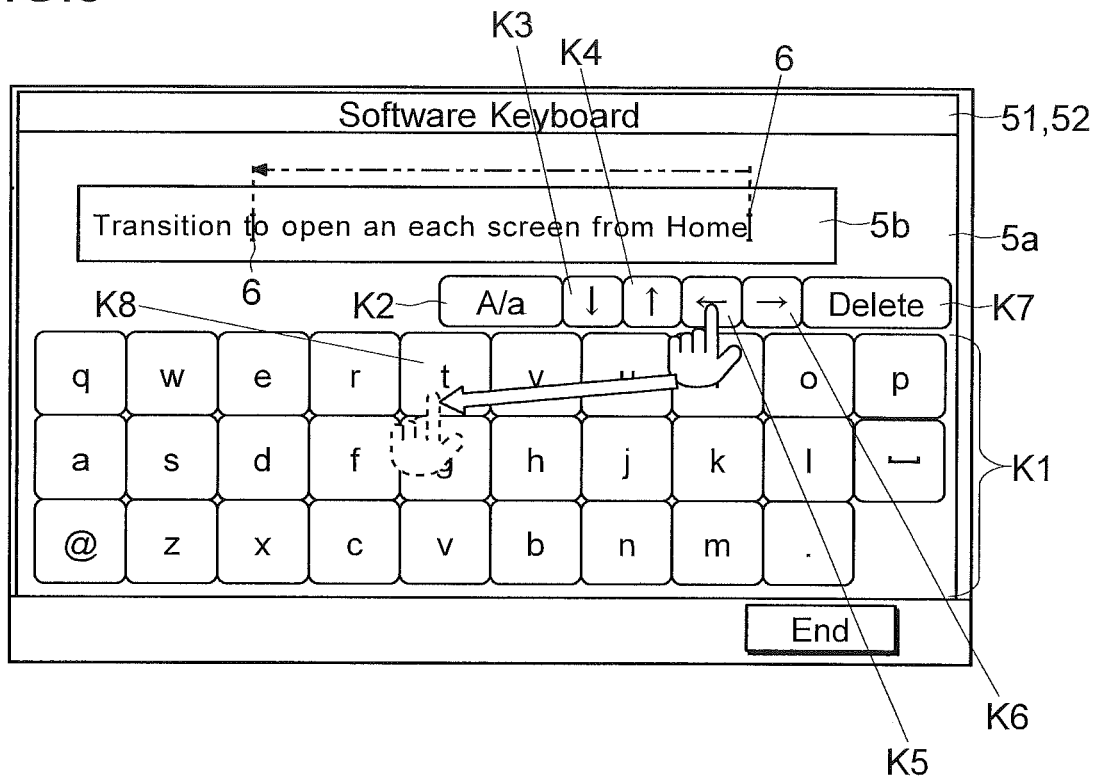
FIG. 5 is a diagram showing one example of moving the cursor using a left-arrow key according to the embodiment.

The controller 1 makes the cursor 6 move in the direction toward the beginning of the character strings (leftward in FIG. 5). In other words, the controller 1 makes the cursor 6 jump in the direction opposite to the input order. When, before a touch on a character key K1 exceeds a long-press time T1, the touch is ended, the controller 1 makes the cursor 6 move to, out of characters corresponding to the touch-end key K8, the character closest, in the direction toward the beginning of the character strings, to the position of the cursor 6 before the move. For example, the controller 1 makes the cursor 6 move to the right side of a character corresponding to the touch-end key K8 (it may be the left side).

FIG. 5 shows how the left-arrow key K5 is touched first, and then, while the touch is kept, the touched position is moved to the character key K1 for the alphabet letter "t". It also shows how, before the touch on the long-press time T1 continues, the touch is ended on the character key K1 for the alphabet letter "t". Based on the output of the touch panel 52, the controller 1 recognizes the touch on the left-arrow key K5, the sliding of the touched position, and the end of the touch. In FIG. 5, the position of the cursor 6 before the move (when the left-arrow key K5 was operated) is at the end of the character strings (text).

FIG. 5 shows how the cursor 6 is moved with those operations. Specifically, FIG. 5 shows how the cursor 6 is moved to the letter "t" corresponding to the touch-end key K8 (see the dash-dot-dot-line arrow). The cursor 6 jumps to the right side of the character "t" closest, in the direction toward the beginning of the character strings, to the position of the cursor 6 before the move.

By long-pressing a character key K1, the position of the cursor 6 can be moved from one place to the next. To move the position of the cursor 6 from one place to the next, a user first operates the left-arrow key K5. Next, the user slides the touched position to the character key K1 corresponding to the character at the destination of the move. Here, the user moves the touched position while keeping the touch. After moving the touched position, the user long-presses the character key K1. The controller 1 recognizes the touch on the same character key K1 to have lasted for the long-press time T1. The controller 1 recognizes the long-pressed character key K1 (the long-press key K9).

Figure 6:
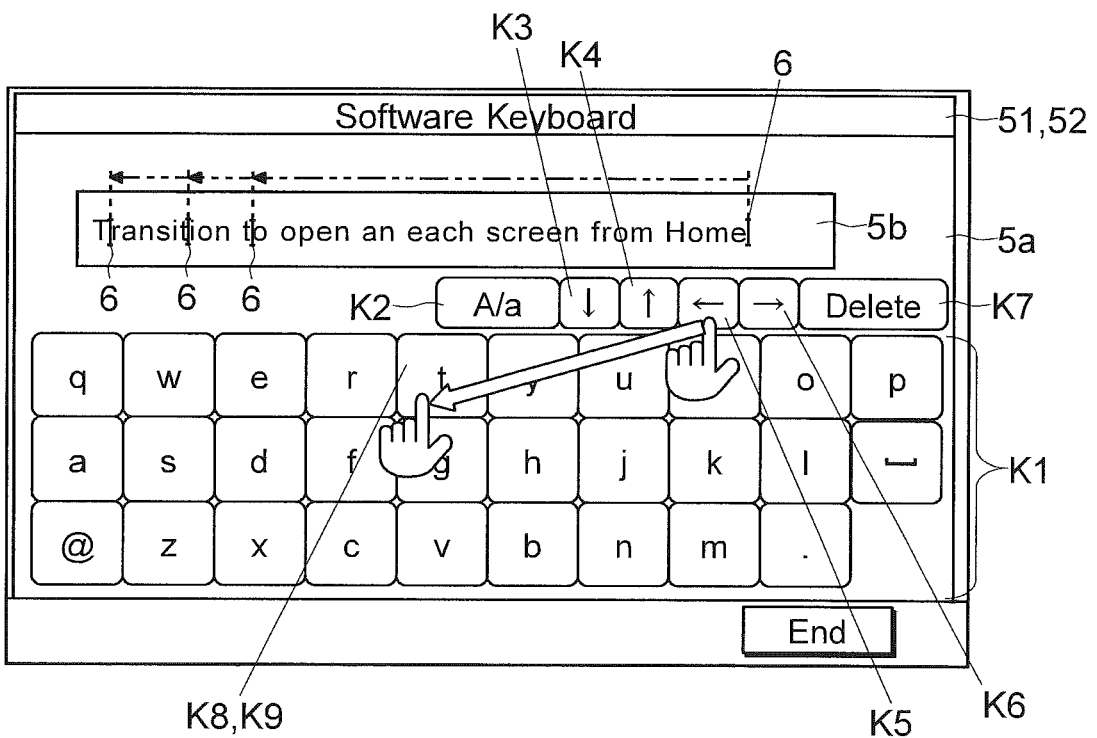
FIG. 6 is a diagram showing one example of moving the cursor using the left-arrow key according to the embodiment.

When the touch on the same character key K1 lasts for the long-press time T1, the controller 1 makes the cursor 6 move in the direction toward the beginning of the character strings (leftward in FIG. 6). In other words, the controller 1 makes the cursor 6 jump in the direction opposite to the input order. The controller 1 makes the cursor 6 move to the position of a character corresponding to the long-press key K9. The controller 1 makes the cursor 6 move to the character closest, in the direction toward the beginning of the character strings, to the cursor 6 before the move. For example, the controller 1 makes the cursor 6 move to the right side of the character corresponding to the long-press key K9 (it may be the left side).

Furthermore, when the input result display field 5b includes a plurality of characters corresponding to the long-press key K9, after the touch for the long-press time T1, every time the time for which the long-press key K9 is kept touched passes the prescribed switching period T2, the controller 1 makes the cursor 6 move (jump). Every time the switching period T2 passes, the controller 1 makes the cursor 6 move in the direction toward the beginning of the character strings (leftward in FIG. 6). The controller 1 makes the cursor 6 move to the position of, out of characters corresponding to the long-press key K9, the character which is the closest to the position of the cursor 6 before the move (that is, the current position) and is on the side toward the beginning of the character strings. For example, the controller 1 makes the cursor 6 move to the right side of the character corresponding to the long-press key K9 (it may be the left side).

FIG. 6 shows how the left-arrow key K5 is touched first, and then, while the touch is kept, the touched position is moved to the character key K1 for the alphabet letter "t". It also shows how the character key K1 for the alphabet letter "t" is kept touched longer than the long-press time T1. Based on the output of the touch panel 52, the controller 1 recognizes the touch on the left-arrow key K5, the sliding of the touched position, and the long-press on a character key K1. In FIG. 6, the position of the cursor 6 at first (when the left-arrow key K5 was operated) is at the end of the character strings (text).

FIG. 6 shows how the cursor 6 is moved from one place to the next by continuing the touch on a character key K1. Specifically, FIG. 6 shows how the cursor 6 is moved, from one place to the next, to the positions of the letter "t" corresponding to the long-press key K9 (see the dash-dot-dot-line arrow).

<Moving the Cursor 6 Using the Case Switching Key K2>

Next, with reference to FIGS. 7 and 8, one example of moving the cursor 6 using the case-switching key K2 according to the embodiment will be described. The controller 1 makes the software keyboard screen 5a display the case-switching key K2. The case-switching key K2 is used as the specific key. First, a user operates the case-switching key K2. Next, the user slides the touched position to the character key K1 corresponding to the character of which the case the user wants to convert. Here, the user moves the touched position while keeping the touch. After moving the touched position, the user ends the touch. The controller 1 recognizes the touch-end key K8. The touch-end key K8 is a character key K1 on which the touch ceases (the finger is removed, the touch ends). After the touched position has moved to a character key K1, when the touch ceases, the controller 1 makes the cursor 6 jump.

Figure 7:
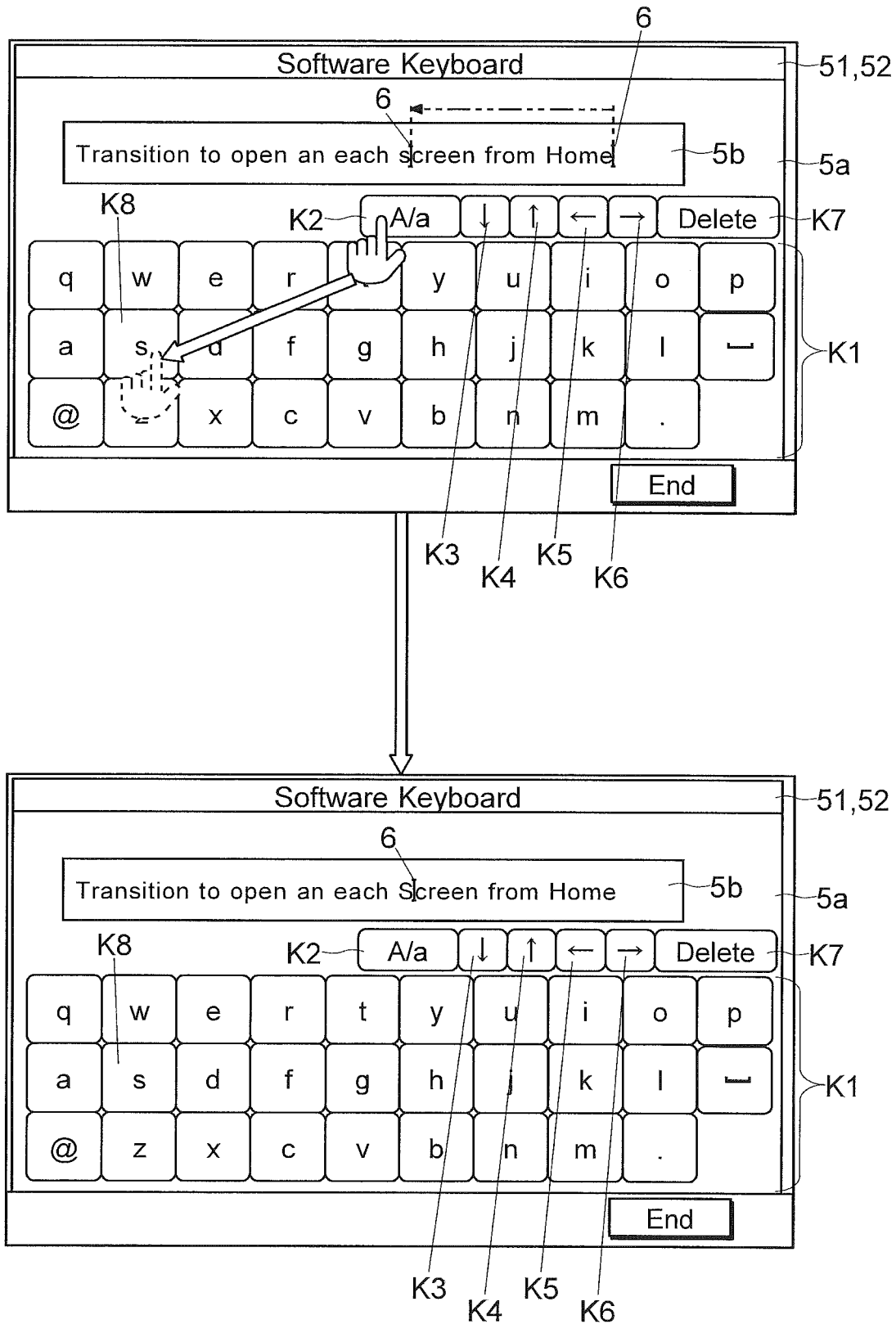
FIG. 7 is a diagram showing one example of moving the cursor using a case-switching key according to the embodiment.

The controller 1 makes the cursor 6 move in the direction toward the beginning of the character strings (leftward in FIG. 7). In other words, the controller 1 makes the cursor 6 jump in the direction opposite to the input order. When, before a touch on a character key K1 exceeds the long-press time T1, the touch is ended, the controller 1 makes the cursor 6 move to the position of, out of characters corresponding to the touch-end key K8, the character closest, in the direction toward the beginning of the character strings, to the position of the cursor 6 before the move.

The upper part of FIG. 7 shows how the case-switching key K2 is touched first, and then, while the touch is kept, the touched position is moved to the character key K1 for the alphabet letter "s". It also shows how the touch is ended on the character key K1 for the alphabet letter "s". Based on the output of the touch panel 52, the controller 1 recognizes the touch on the case-switching key K2, the sliding of the touched position, and the end of the touch. In the upper part of FIG. 7, the position of the cursor 6 before the move (when the case-switching key K2 was operated) is at the end of the character strings (text).

The upper part of FIG. 7 shows how the cursor 6 is moved with those operations. Specifically, the upper part of FIG. 7 shows how the cursor 6 is moved to the letter "s" corresponding to the touch-end key K8 (see the dash-dot-dot-line arrow). The cursor 6 jumps to the right side of the character "s" closest to the position of the cursor 6 before the move.

As shown in the lower part of FIG. 7, the controller 1 converts the character which corresponds to the touch-end key K8 and which is next to (immediately on the left of) the cursor 6 after the move. The lower part of FIG. 7 shows a state of the alphabet letter "s" after the conversion. When the character which corresponds to the touch-end key K8 and is next to the cursor 6 after the move is upper-case, the controller 1 automatically converts it to lower-case. When the character which corresponds to the touch-end key K8 and is next to the cursor 6 after the move is lower-case, the controller 1 automatically converts it to upper-case. A user can, simply by sliding the touch, covert a desired character from the upper case to the lower case, or from the lower case to the upper case.

By long-pressing a character key K1, the position of the cursor 6 can be moved from one place to the next. To move the position of the cursor 6 from one place to the next, a user first operates the case-switching key K2. Next, the user slides the touched position to the character key K1 corresponding to the character to be converted. Here, the user moves the touched position while keeping the touch. After moving the touched position, the user long-presses the character key K1. The controller 1 recognizes the touch on the same character key K1 to have lasted for the long-press time T1. The controller 1 recognizes the long-pressed character key K1 (the long-press key K9).

Figure 8:
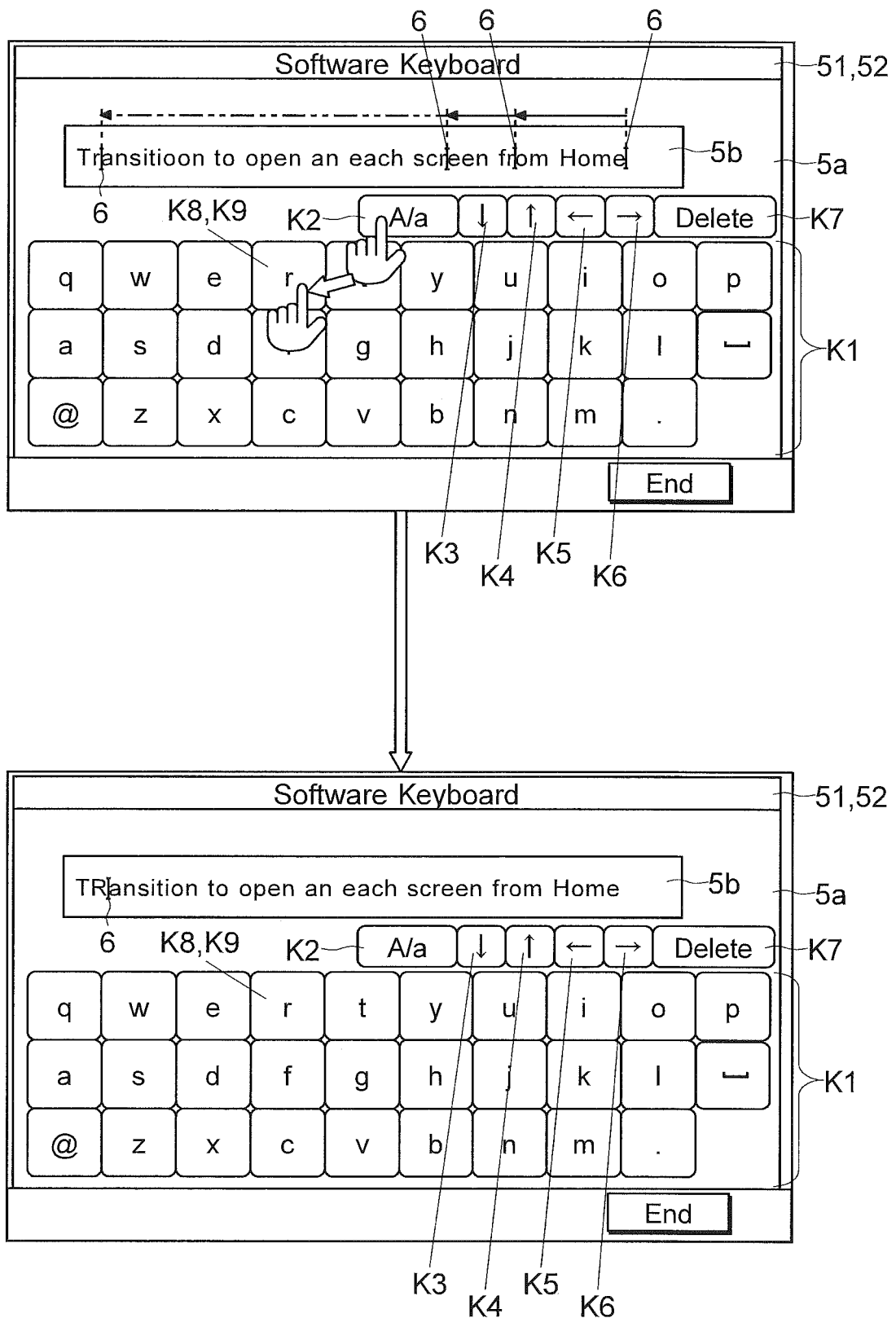
FIG. 8 is a diagram showing one example of moving the cursor using the case-switching key according to the embodiment.

When the touch on the same character key K1 lasts for the long-press time T1, the controller 1 makes the cursor 6 move in the direction toward the beginning of the character strings (leftward in FIG. 8). In other words, the controller 1 makes the cursor 6 jump in the direction opposite to the input order. The controller 1 makes the cursor 6 move to the position of, out of characters corresponding to the long-press key K9, the character closest, in the direction toward the beginning of the character strings, to the position of the cursor 6 before the move. For example, the controller 1 makes the cursor 6 move to the right side of the character corresponding to the long-press key K9 (it may be the left side).

Furthermore, when the input result display field 5b includes a plurality of characters corresponding to the long-press key K9, after the touch for the long-press time T1, every time the time for which the long-press key K9 (the same character key K1) is kept touched passes the switching period T2, the controller 1 makes the cursor 6 move (jump).

Every time the switching period T2 passes, the controller 1 makes the cursor 6 move in the direction toward the beginning of the character strings (leftward in FIG. 8). The controller 1 makes the cursor 6 move to the position of, out of characters corresponding to the long-press key K9, the character which is on the side toward the beginning of the character strings and is closest to the current position of the cursor 6 (that is, the position before the move). For example, the controller 1 makes the cursor 6 move to the right side of the character corresponding to the long-press key K9 (it may be the left side).

The upper part of FIG. 8 shows how the case-switching key K2 is touched first, and then, while the touch is kept, the touched position is moved to the character key K1 for the alphabet letter "r". It also shows how the character key K1 for the alphabet letter "r" is kept touched longer than the long-press time T1. Based on the output of the touch panel 52, the controller 1 recognizes the touch on the case-switching key K2, the sliding of the touched position, and the long-press on the character key K1. In the upper part of FIG. 8, the position of the cursor 6 at first (when the case-switching key K2 was operated) is at the end of the character strings (text).

The upper part of FIG. 8 shows how the cursor 6 is moved from one place to the next by continuing the touch on a character key K1. Specifically, the upper part of FIG. 8 shows how the cursor 6 is moved, from one place to the next, to the positions of the letter "r" corresponding to the long-press key K9 (see the dash-dot-dot-line arrow).

Furthermore, as shown in the lower part of FIG. 8, the controller 1 automatically converts, out of characters corresponding to the long-press key K9, the character next to (immediately on the left of) the cursor 6 when the touch ceases. The lower part of FIG. 8 shows a state of the alphabet letter "r" after the conversion. In the lower part of FIG. 8, the character after the conversion is the letter "R", which is the second character from the beginning. When the cursor 6 has moved to the character to be converted, a user can end the touch.

<Moving the Cursor 6 Using the Character Key K1>

Next, with reference to FIGS. 9 and 10, one example of moving the cursor 6 using the character key K1 according to the embodiment will be described. The controller 1 makes the software keyboard screen 5a display character keys K1. The multifunction peripheral 100 allows a user to specify, using the character key K1, a character input by mistake and to move the cursor 6 to the specified character easily. The character input by mistake can be converted to a desired character. To do so, the user first operates the character key K1 corresponding to the character input by mistake. The controller 1 recognizes a touch-start key K10. The touch-start key K10 is a character key K1 which is touched first. First, the user touches the character key K1 corresponding to the character input by mistake.

Next, the user slides the touched position to the character key K1 corresponding to the character after the replacement (the correct character). Here, the user moves the touched position while keeping the touch. After moving the touched position, the user ends the touch. The controller 1 recognizes the touch-end key K8. The touch-end key K8 is a character key K1 on which the touch ceases (the finger is removed, the touch ends). After the character key K1 is touched and then the touched position is moved to a different character key K1, when the touch ceases on the different character, the controller 1 makes the cursor 6 jump.

Figure 9:
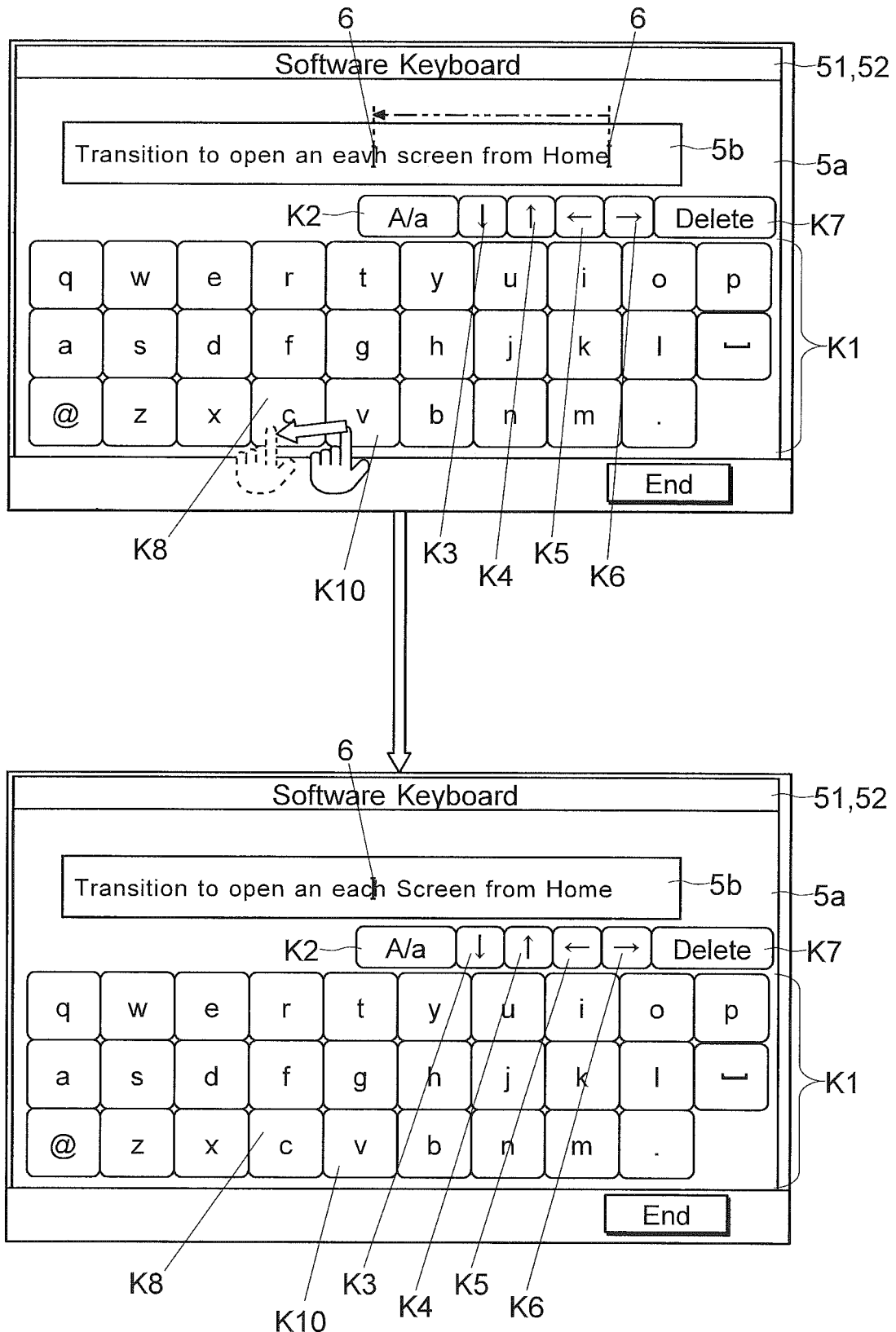
FIG. 9 is a diagram showing one example of moving the cursor using a character key according to the embodiment.

The controller 1 makes the cursor 6 move in the direction toward the beginning of the character strings (leftward in FIG. 9). In other words, the controller 1 makes the cursor 6 jump in the direction opposite to the input order. When, before a touch on the same character key K1 that is a different character key K1 from the one touched first exceeds a long-press time T1, the touch ceases, the controller 1 makes the cursor 6 move to the position of, out of characters corresponding to the touch-start key K10, the character which is on the side toward the beginning of the character strings and is closest to the position of the cursor 6 before the move.

The upper part of FIG. 9 shows how the character key K1 for the alphabet letter "v" is touched, and then, while the touch is kept, the touched position is moved to the character key K1 for the alphabet letter "c". It also shows how the touch is ended on the character key K1 for the alphabet letter "c". Based on the output of the touch panel 52, the controller 1 recognizes the touch on the character key K1, the sliding of the touched position, and the end of the touch. In the upper part of FIG. 9, the position of the cursor 6 before the move (when the character key K1 was operated) is at the end of the character strings (text).

The upper part of FIG. 9 shows how the cursor 6 is moved with those operations. Specifically, the upper part of FIG. 9 shows how the cursor 6 is moved to the letter "v" corresponding to the touch-start key K10 (see the dash-dot-dot-line arrow). In the example in the upper part of FIG. 9, the cursor 6 jumps from the end of the character strings to the right side of the alphabet letter "v".

Furthermore, as shown in the lower part of FIG. 9, the controller 1 replaces the character which corresponds to the touch-start key K10 and which is next to (immediately on the left of) the cursor 6 after the move. The lower part of FIG. 9 shows a state where the alphabet letter "v" has been replaced with the alphabet letter "c". The controller 1 replaces the character which corresponds to the touch-start key K10 and which is next to (immediately on the left of) the cursor 6 after the move with the character corresponding to the touch-end key K8.

By long-pressing a character key K1, the position of the cursor 6 can be moved from one place to the next. To move the position of the cursor 6 from one place to the next, a user first operates the character key K1. First, the user operates the character key K1 corresponding to the character input by mistake. The controller 1 recognizes a touch-start key K10.

Next, the user slides the touched position to the character key K1 corresponding to the character after the replacement (the correct character). Here, the user moves the touched position while keeping the touch. After moving the touched position, the user long-presses the character key K1 corresponding to the correct character. The controller 1 recognizes the touch on the same character key K1 to have lasted for the long-press time T1. The controller 1 recognizes the long-press key K9.

Figure 10:
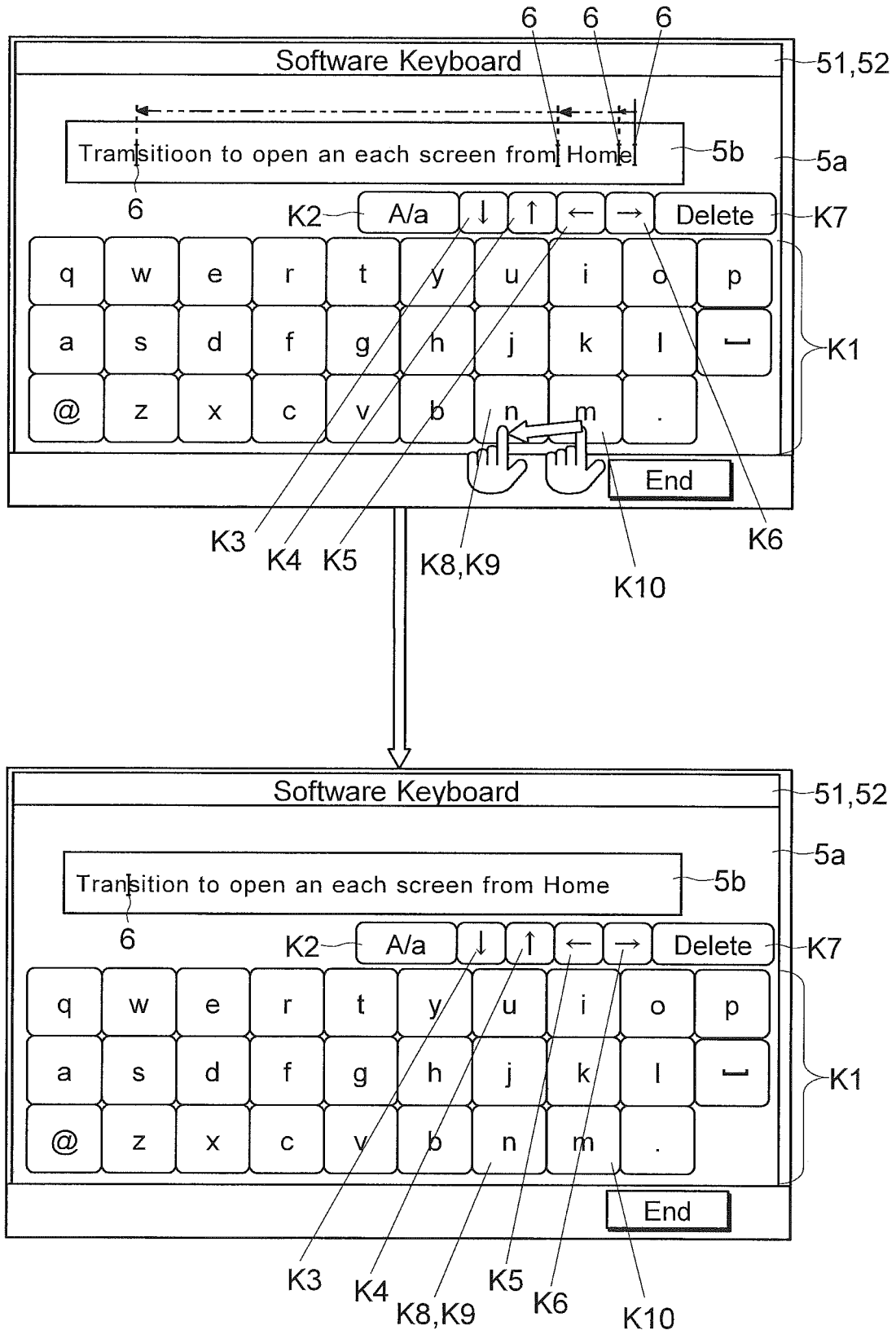
FIG. 10 is a diagram showing one example of moving the cursor using the character key according to the embodiment.

When the touch on the same character key K1 lasts for the long-press time T1, the controller 1 makes the cursor 6 move in the direction toward the beginning of the character strings (leftward in FIG. 10). In other words, the controller 1 makes the cursor 6 jump in the direction opposite to the input order. The controller 1 makes the cursor 6 move to the position of, out of characters corresponding to the touch-start key K10, the character closest, in the direction toward the beginning of the character strings, to the position of the cursor 6 before the move.

Furthermore, when the input result display field 5b includes a plurality of characters corresponding to the touch-start key K10, after the touch for the long-press time T1, every time the time for which the long-press key K9 is kept touched passes the switching period T2, the controller 1 makes the cursor 6 move (jump).

Every time the switching period T2 passes, the controller 1 makes the cursor 6 move in the direction toward the beginning of the character strings (leftward in FIG. 10). The controller 1 makes the cursor 6 move to the position of, out of characters corresponding to the touch-start key K10, the character which is on the side toward the beginning of the character strings and is closest to the current position of the cursor 6. For example, the controller 1 makes the cursor 6 move to the right side of a character corresponding to the touch-start key K10 (it may be the left side).

The upper part of FIG. 10 shows how the character key K1 for the alphabet letter "m" is touched, and then, while the touch is kept, the touched position is moved to the character key K1 for the alphabet letter "n". It also shows how the character key K1 for the alphabet letter "n" is kept touched longer than the long-press time T1. Based on the output of the touch panel 52, the controller 1 recognizes the touch on the character key K1, the sliding of the touched position, and the long-press on a character key K1. In the upper part of FIG. 10, the position of the cursor 6 at first (when the character key K1 was operated) is at the end of the character strings (text).

The upper part of FIG. 10 shows how the cursor 6 is moved from one place to the next by continuing the touch on a character key K1. Specifically, the upper part of FIG. 10 shows how the cursor 6 is moved, from one place to the next, to the positions of the letter "m" corresponding to the touch-start key K10 (see the dash-dot-dot-line arrow).

Furthermore, as shown in the lower part of FIG. 10, the controller 1 automatically replaces, out of characters corresponding to the touch-start key K10, the character next to (immediately on the left of) the cursor 6 when the touch ceases. The lower part of FIG. 10 shows an example where the alphabet letter "m" that is the fourth character from the beginning is replaced with the alphabet letter "n". When the cursor 6 has moved to the character to be replaced, a user can end the touch.

As described above, the display input device (the multifunction peripheral 100) according to the embodiment includes the display panel 51, the touch panel 52, and the controller 1. The display panel 51 performs display. The touch panel 52 senses touch operations on the display panel 51. The controller 1 makes the display panel 51 display the software keyboard screen 5a including a plurality of software keys. Based on the output of the touch panel 52, the controller 1 recognizes the software key that is operated. The controller 1 displays the input result display field 5b that displays characters input through the operation of the software keys on the software keyboard screen 5a, and displays the cursor 6 that indicates an input position in the input result display field 5b. When the specific key, that is, a prescribed software key, is touched first, and then while the touch is kept, the touched position moves to a character key K1, and then the touch ceases, the controller 1 makes the cursor 6 move to the position of, out of characters in the input result display field 5b, the character corresponding to the touch-end key K8, which is the character key K1 on which the touch ceases. The character keys K1 are software keys for inputting characters. Simply by touching the specified key and sliding the touch (dragging, flicking), the cursor 6 can be moved to a desired position. Then, the user can end the touch on (remove the finger from) the character key K1 corresponding to the character at the destination of the cursor 6. The user does not need to operate software keys a plurality of times to move the position of the cursor 6. The user can make the cursor 6 jump to a desired position with one operation.

The controller 1 displays the delete key K7 as the specific key on the software keyboard screen 5a. When the delete key K7 is touched, and while the touch is kept, the touched position moves to a character key K1, and then the touch ceases, the controller 1 makes the cursor 6 move to the position of, out of characters in the input result display field 5b, the character which is in the direction toward the beginning of the character strings with respect to the cursor 6 before the move and which corresponds to the touch-end key K8 and is closest to the cursor 6 before the move. The controller 1 automatically deletes, out of characters in the input result display field 5b, the character which corresponds to the touch-end key K8 and which is next to (immediately on the left of) the cursor 6 after the move. Simply by touching the delete key K7, sliding the touch, and ending the touch on the character key K1, the cursor 6 can be moved to a desired position. The user can make the cursor 6 jump to a desired position with one operation. Furthermore, the user can delete the character corresponding to the touch-end key K8. The user can end the touch on (remove the finger from) the character key K1 corresponding to the character to be deleted. With one operation, the cursor 6 can be moved to a desired position and a desired character can be deleted.

When the delete key K7 is touched, and while the touch is kept, the touched position moves to a character key K1, and then the touch on the same character key K1 is kept for the prescribed long-press time T1, the controller 1 makes the cursor 6 move to the position of the character corresponding to the long-press key K9, which is the character key on which the touch has lasted for the long-press time T1. When the input result display field 5b includes a plurality of characters corresponding to the long-press key K9, after the touch on the long-press key K9 for the long-press time T1, every time the time for which the long-press key K9 is kept touched passes the prescribed switching period T2, the controller 1 makes the cursor 6 move, from one place to the next, to the positions of the character corresponding to the long-press key K9. The controller 1 automatically deletes the character which is next to the cursor 6 when the touch ceases and which corresponds to the long-press key K9. Simply by touching the delete key K7, sliding the touch, and long-pressing the character key K1, the options of the destination of the cursor 6 can be switched from one place to the next. The user can end the touch (remove the finger) when the cursor 6 is at a desired position. The cursor 6 can be moved to the desired position. By ending the touch when the cursor 6 is at the position of the character to be deleted, the user can delete a desired character. With one operation, the character to be deleted can be selected and deleted.

The controller 1 displays an arrow key (the left-arrow key K5) as the specific key on the software keyboard screen 5a. When the arrow key is touched, and while the touch is kept, the touched position moves to a character key K1, and then the touch ceases, the controller 1 makes the cursor 6 move to the position of the character which is in the direction toward the beginning of the character strings with respect to the cursor 6 before the move and which corresponds to the touch-end key K8 and is closest to the cursor 6 before the move. Simply by touching the arrow key, sliding the touch, and ending the touch on the character key K1, the cursor 6 can be moved to a desired position. With one operation, the cursor 6 can be jumped to a desired position. The user can end the touch (remove the finger) on the character key K1 corresponding to the character at the destination of the cursor 6. With one operation, the cursor 6 can be moved to a desired position.

When the arrow key is touched, and while the touch is kept, the touched position moves to a character key K1, and the touch on the same character key K1 is kept for the prescribed long-press time T1, the controller 1 makes the cursor 6 move to the position of the character corresponding to the long-press key K9, which is the character key K1 on which the touch has lasted for the long-press time T1. When the input result display field 5b includes a plurality of characters corresponding to the long-press key K9, after the touch on the long-press key K9 for the long-press time T1, every time the time for which the long-press key K9 is kept touched passes the prescribed switching period T2, the controller 1 makes the cursor 6 move, from one place to the next, to the positions of the character corresponding to the long-press key K9. When the touch ceases, the controller 1 makes the cursor 6 stop the move. Simply by touching the arrow key, sliding the touch, and long-pressing the character key K1, the options of the destination of the cursor 6 can be switched. By ending the touch (removing the finger) when the cursor 6 is at a desired position, the cursor 6 can be moved to a desired position.

The controller 1 displays the case-switching key K2 as the specific key on the software keyboard screen 5a. When the case-switching key K2 is touched, and while the touch is kept, the touched position moves to a character key K1, and then the touch ceases, the controller 1 makes the cursor 6 move to the position of, out of characters in the input result display field 5b, the character which is in the direction toward the beginning of the character strings with respect to the cursor 6 before the move and which corresponds to the touch-end key K8 and is closest to the cursor 6 before the move. When the character which corresponds to the touch-end key K8 and is next to the cursor 6 after the move is upper-case, the controller 1 automatically converts it to lower-case. When the character which corresponds to the touch-end key K8 and is next to the cursor 6 after the move is lowercase, the controller 1 automatically converts it to upper-case. Simply by touching the case-switching key K2, sliding the touch, and ending the touch, the cursor 6 can be moved to a desired position. With one operation, the cursor 6 can be jumped to a desired position. In addition, the case of the character corresponding to the touch-end key K8 can be converted. The user can end the touch on (remove the finger from) the character key K1 corresponding to the character after the conversion. With one operation, the cursor 6 can be moved to a desired position and a desired character can be converted.

When the case-switching key K2 is touched, and while the touch is kept, the touched position moves to a character key K1, and then the touch on the same character key K1 is kept for the prescribed long-press time T1, the controller 1 makes the cursor 6 move to the position of the character corresponding to the long-press key K9, which is the character key K1 on which the touch has lasted for the long-press time T1. When the input result display field 5b includes a plurality of characters corresponding to the long-press key K9, after the touch on the long-press key K9 for the long-press time T1, every time the time for which the long-press key K9 is kept touched passes the prescribed switching period T2, the controller 1 makes the cursor 6 move, from one place to the next, to the positions of the character corresponding to the long-press key K9. When the character which is next to the cursor 6 when the touch ceases and which corresponds to the long-press key K9 is upper-case, the controller 1 automatically converts it to lower-case. When the character which is next to the cursor 6 when the touch ceases and which corresponds to the long-press key K9 is lower-case, the controller 1 automatically converts it to upper-case. Simply by touching the case-switching key K2, sliding the touch, and long-pressing the character key K1, the options of the destination of the cursor 6 can be switched. A user can end the touch when the cursor 6 is at a desired position. The cursor 6 can be moved to the desired position. By ending the touch when the cursor 6 is at the character to be converted, the character can be converted. With one operation, the character after the conversion can be selected and the character can be converted.

When any of the character keys K1 is touched, and while the touch is kept, the touched position moves to a character key K1, and then the touch ceases, the controller 1 recognizes the touch-start key K10, which is the character key K1 touched first. The controller 1 makes the cursor 6 move to the position of, out of characters in the input result display field 5b, the character which is in the direction toward the beginning of the character strings with respect to the cursor 6 before the move and which corresponds to the touch-start key K10 and is closest to the cursor 6 before the move. The controller 1 replaces the character which corresponds to the touch-start key K10 and is next to the cursor 6 after the move with the character corresponding to the touch-end key K8. Simply by touching the character key K1, sliding the touch, and ending the touch (removing the finger), the cursor 6 can be moved. With one operation, the cursor 6 is jumped to a desired position. The character corresponding to the touch-start key K10 can be replaced with the character corresponding to the touch-end key K8. With one operation, the cursor 6 can be moved to a desired position and a desired character can be replaced.

When any of the character key K1 is touched, and while the touch is kept, the touched position moves to a character key K1, and then the touch on the same character key K1 is kept for the prescribed long-press time T1, the controller 1 recognizes the long-press key K9, which is the character key K1 on which the touch has lasted for the long-press time T1. The controller 1 makes the cursor 6 move to the position of a character corresponding to the touch-start key K10. When the input result display field 5b includes a plurality of characters corresponding to the touch-start key K10, after the touch on the long-press key K9 for the long-press time T1, every time the time for which the long-press key K9 is kept touched passes the prescribed switching period T2, the controller 1 makes the cursor 6 move, from one place to the next, to the positions of the character corresponding to the touch-start key K10. The controller 1 replaces the character which is next to the cursor 6 when the touch ceases and which corresponds to the touch-start key K10 with the character corresponding to the long-press key K9. Simply by touching a character key K1, sliding the touch, and long-pressing a different character key K1, the options of the destination of the cursor 6 can be switched. Simply by ending the touch (removing the finger), the cursor 6 can be moved to a desired position. A user can end the touch when the cursor 6 is at the position of the character to be replaced. The character input by mistake can be replaced with the correct character. With one operation, the character after the replacement can be selected and the character can be replaced with the correct one.

The embodiment of the present disclosure described above is in no way meant to limit the present disclosure, which thus allows for many modifications and variations within the spirit of the present disclosure.

What is claimed is:

1. A display input device, comprising:
a display panel which performs display;
a touch panel which senses touch operation on the display panel; and
a controller which
makes the display panel display a software keyboard screen including a plurality of software keys,
recognizes an operated software key based on an output of the touch panel,
displays an input result display field which displays a character input through operation of the software keys on the software keyboard screen,
displays a cursor which indicates an input position in the input result display field,
when a specific key, which is a prescribed software key, is touched first, and while a touch is kept, a touched position moves to a character key which is the software key for inputting a character, and then the touch ceases, makes the cursor move to a position of, out of characters in the input result display field, a character corresponding to a touch-end key, which is the character key on which the touch ceases,
displays a delete key as the specific key on the software keyboard screen,
when the delete key is touched, and while the touch is kept, the touched position moves to the character key, and then the touch ceases, makes the cursor move to the position of, out of the characters in the input result display field, the character which is in a direction toward a beginning of character strings with respect to the cursor before the move and which corresponds to the touch-end key and is closest to the cursor before the move, automatically deletes, out of the characters in the input result display field, the character which corresponds to the touch-end key and which is next to the cursor after the move,
when the delete key is touched, and while the touch is kept, the touched position moves to the character key, and then the touch on the same character key is kept for a prescribed long-press time, makes the cursor move to the position of the character corresponding to a long-press key, which is the character key on which the touch has lasted for the long-press time, when the input result display field includes a plurality of characters corresponding to the long-press key, after the touch on the long-press key for the long-press time, every time a time for which the long-press key is kept touched passes a prescribed switching period, makes the cursor move, from one place to a next, to positions of the character corresponding to the long-press key, and automatically deletes the character which is next to the cursor when the touch ceases and corresponds to the long-press key.

2. The display input device according to claim 1, wherein when any of the character keys is touched, and while the touch is kept, the touched position moves to the character key, and then the touch ceases, the controller recognizes the character key touched first as a tough-start key, makes the cursor move to the position of, out of the characters in the input result display field, the character which is in the direction toward the beginning of the character strings with respect to the cursor before the move and which corresponds to the touch-start key and is closest to the cursor before the move, and replaces the character which corresponds to the touch-start key and which is next to the cursor after the move with the character corresponding to the character key on which the touch ceases.

3. The display input device according to claim 2, wherein the controller when any of the character keys is touched, and while the touch is kept, the touched position moves to the character key, and then the touch on the same character key is kept for the prescribed long-press time, recognizes the long-press key, which is the character key on which the touch has lasted for the long-press time, makes the cursor move to the position of the character corresponding to the touch-start key, when the input result display field includes a plurality of characters corresponding to the touch-start key, after the touch on the long-press key for the long-press time, every time a time for which the long-press key is kept touched passes a prescribed switching period, makes the cursor move, from one place to the next, to the positions of the character corresponding to the touch-start key, and replaces the character which is next to the cursor when the touch ceases and which corresponds to the touch-start key with the character corresponding to the long-press key.

4. The display input device according to claim 1, wherein the controller recognizes a destination of a transmission job, information related to a user, an image file name, or e-mail text, which are set on the software keyboard screen.

5. A display input device comprising:

a display panel which performs display;

a touch panel which senses touch operation on the display panel; and a controller which makes the display panel display a software keyboard screen including a plurality of software keys, recognizes an operated software key based on an output of the touch panel, displays an input result display field which displays a character input through operation of the software keys on the software keyboard screen, displays a cursor which indicates an input position in the input result display field; and when a specific key, which is a prescribed software key, is touched first, and while a touch is kept, a touched position moves to a character key which is the software key for inputting a character, and then the touch ceases, makes the cursor move to a position of, out of characters in the input result display field, a character corresponding to a touch-end key, which is the character key on which the touch ceases, displays an arrow key as the specific key on the software keyboard screen, when the arrow key is touched, and while the touch is kept, the touched position moves to the character key, and then the touch ceases, makes the cursor move to the position of the character which is in a direction toward a beginning of character strings with respect to the cursor before the move and which corresponds to the touch-end key and is closest to the cursor before the move, when the arrow key is touched, and while the touch is kept, the touched position moves to the character key, and then the touch on the same character key is kept for a prescribed long-press time, makes the cursor move to the position of the character corresponding to a long-press key, which is the character key on which the touch has lasted for the long-press time, when the input result display field includes a plurality of characters corresponding to the long-press key, after the touch on the long-press key for the long-press time, every time a time for which the long-press key is kept touched passes a prescribed switching period, makes the cursor move, from one place to the next, to the positions of the character corresponding to the long-press key, and when the touch ceases, makes the cursor stop the move.

6. A display input device, comprising:

a display panel which performs display;

a touch panel which senses touch operation on the display panel; and a controller which makes the display panel display a software keyboard screen including a plurality of software keys, recognizes an operated software kay based on an output of the touch panel, displays an input result display field which displays a character input through operation of the software keys on the software keyboard screen, displays a cursor which indicates an input position in the input result display field, when a specific key, which is a prescribed software key, is touched first, and while a touch is kept, a touched position moves to a character key which is the software key for inputting a character, and then the touch ceases, makes the cursor move to a position of, out of characters in the input result display field, a character corresponding to a touch-end key, which is the character key on which the touch ceases, displays a case-switching key as the specific key on the software keyboard screen, when the case-switching key is touched, and while the touch is kept, the touched position moves to the character key, and then the touch ceases, makes the cursor move to the position of, out of the characters in the input result display field, the character which is in a direction toward the beginning of character strings with respect to the cursor before the move and which corresponds to the touch-end key and is closest to the cursor before the move, when the character which corresponds to the touch-end key and which is next to the cursor after the move is upper-case, automatically converts the upper-case character to lower-case, and when the character which corresponds to the touch-end key and which is next to the cursor after the move is lower-case, automatically converts the lower-case character to upper-case, when the case-switching key is touched, and while the touch is kept, the touched position moves to the character key, and then the touch on the same character key is kept for a prescribed long-press time, makes the cursor move to the position of the character corresponding to a long-press key, which is the character key on which the touch has lasted for the long-press time, when the input result display field includes a plurality of characters corresponding to the long-press key, after the touch on the long-press key for the long-press time, every time a time for which the long-press key is kept touched passes a prescribed switching period, makes the cursor move, from one place to the next, to the positions of the character corresponding to the long-press key, when the character which is next to the cursor when the touch ceases and which corresponds to the long-press key is upper-case, automatically converts the upper-case character to lower-case, and when the character which is next to the cursor when the touch ceases and which corresponds to the long-press key is lower-case, automatically converts the lower-case character to upper-case.

* * * * *